United States Patent
Sasaki (10) Patent No.: US 9,313,416 B2
(45) Date of Patent: Apr. 12, 2016

(54) IMAGE PROCESSING APPARATUS THAT PERFORMS GRADATION CORRECTION OF PHOTOGRAPHED IMAGE, METHOD OF CONTROLLING THE SAME, AND STORAGE MEDIUM

(71) Applicant: CANON KABUSHIKI KAISHA, Tokyo (JP)

(72) Inventor: Takashi Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 14/202,329

(22) Filed: Mar. 10, 2014

(65) Prior Publication Data
US 2014/0267841 A1    Sep. 18, 2014

(30) Foreign Application Priority Data
Mar. 14, 2013    (JP) .................................. 2013-051879

(51) Int. Cl.
*H04N 5/235* (2006.01)
*H04N 5/232* (2006.01)

(52) U.S. Cl.
CPC ......... *H04N 5/2355* (2013.01); *H04N 5/23229* (2013.01)

(58) Field of Classification Search
CPC ... H04N 5/235; H04N 5/2355; H04N 5/2354; G06T 5/50
See application file for complete search history.

(56) References Cited

U.S. PATENT DOCUMENTS

| 8,355,059 B2 | 1/2013 | Fukui |
| 2008/0187235 A1* | 8/2008 | Wakazono et al. ........... 382/255 |
| 2010/0201843 A1 | 8/2010 | Fukui |
| 2012/0147232 A1 | 6/2012 | Takayama et al. |
| 2012/0314095 A1 | 12/2012 | Fukui |
| 2014/0010444 A1 | 1/2014 | Sasaki et al. |

FOREIGN PATENT DOCUMENTS

| JP | 2006-039666 A | 2/2006 |
| JP | 2010-193099 A | 9/2010 |
| JP | 2012-044559 A | 3/2012 |

* cited by examiner

*Primary Examiner* — Christopher K Peterson
(74) *Attorney, Agent, or Firm* — Fitzpatrick, Cella, Harper & Scinto (57) ABSTRACT

An image processing apparatus capable of reducing processing load by determining whether or not to perform gradation correction, according to a difference or a ratio between feature values of object areas, and generating an excellent image by performing gradation correction. An image dividing section divides an input image into a plurality of predetermined object areas. A feature value calculation section and a determination section compare the feature values indicative of features of the respective object areas, obtain a luminance level difference, and determine whether or not the difference is within a predetermined range. When the difference is within the predetermined range, an image processing section and a system controller perform area-by-area tone mapping on respective images of the areas to form a synthesized image.

10 Claims, 6 Drawing Sheets

IMAGE PROCESSING APPARATUS THAT PERFORMS GRADATION CORRECTION OF PHOTOGRAPHED IMAGE, METHOD OF CONTROLLING THE SAME, AND STORAGE MEDIUM

BACKGROUND OF THE INVENTION

1. Field of the Invention

The present invention relates to an image processing apparatus, a method of controlling the same, and a storage medium, and more particularly to an image processing apparatus that performs gradation correction of a photographed image obtained through photographing.

2. Description of the Related Art

In general, in an image processing apparatus, such as a digital camera, to obtain a photographed image having desired brightness and contrast, an object image in the photographed image and photographing information on a photographed scene are analyzed to perform gradation correction of the photographed image.

Particularly, in an image photographed in a so-called backlight scene in which the brightness of an object, such as a person, is markedly lower than that of background, an object image becomes dark. To overcome this problem, by performing gradation correction of the object image, it is possible to obtain a photographed image having desired brightness and contrast.

By the way, to obtain a photographed image having desired brightness and contrast, there has been proposed an image processing apparatus configured to perform a dynamic range-increasing process or a dynamic range-reducing process according to a photographed scene (see Japanese Patent Laid-Open Publication No. 2010-193099). In Japanese Patent Laid-Open Publication No. 2010-193099, when the dynamic range-increasing process is performed, an image is photographed by reducing imaging sensitivity, and gradation correction is performed on the photographed image so as to compensate for reduction of the imaging sensitivity.

Further, there has been proposed an image processing apparatus configured to determine whether or not to perform gradation correction, according to an exposure at which an image is photographed (Japanese Patent Laid-Open Publication No. 2012-44559). In Japanese Patent Laid-Open Publication No. 2012-44559, to suppress so-called blown-out highlights (saturated pixels), a maximum exposure value is determined within which the reduction of the imaging sensitivity can be compensated for by gradation correction, and when an image is photographed, if an exposure value is smaller than the maximum exposure value, gradation correction is performed, whereas if the exposure value is not smaller than the maximum exposure value, gradation correction is not performed.

However, in the methods described in Japanese Patent Laid-Open Publication No. 2010-193099 and Japanese Patent Laid-Open Publication No. 2012-44559, gradation correction is performed on an entire image such that the brightness of a single object image is made appropriate, and hence the contrast of object images is reduced, resulting in a so-called sleepy image.

SUMMARY OF THE INVENTION

The present invention provides an image processing apparatus which is capable of reducing processing load by determining whether or not to perform gradation correction, according to a difference or a ratio between feature values, such as luminance values, of object areas, and generating an excellent image by performing gradation correction, as required, a method of controlling the same, and a storage medium.

In a first aspect of the present invention, there is provided an image processing apparatus that obtains an output image by performing image processing on an input image, comprising a dividing unit configured to divide the input image into a plurality of predetermined object areas, a determination unit configured to compare feature values indicative of features of the respective object areas to thereby obtain a difference or a ratio between the feature values, and determine whether or not the difference or the ratio is within a predetermined range, and an image processing unit configured, when it is determined by the determination unit that the difference or the ratio is within the predetermined range, to perform gradation correction on each of the object areas to thereby form the output image.

In a second aspect of the present invention, there is provided a method of controlling an image processing apparatus that obtains an output image by performing image processing on an input image, comprising dividing the input image into a plurality of predetermined object areas, comparing feature values indicative of features of the respective object areas to thereby obtain a difference or a ratio between the feature values, and determining whether or not the difference or the ratio is within a predetermined range, and performing, when it is determined by the determining that the difference or the ratio is within the predetermined range, gradation correction on each of the object areas to thereby form the output image.

In a third aspect of the present invention, there is provided a non-transitory computer-readable storage medium storing a control program for causing a computer to execute a method of controlling an image processing apparatus that obtains an output image by performing image processing on an input image, wherein the method comprises dividing the input image into a plurality of predetermined object areas, comparing feature values indicative of features of the respective object areas to thereby obtain a difference or a ratio between the feature values, and determining whether or not the difference or the ratio is within a predetermined range, and performing, when it is determined by the determining that the difference or the ratio is within the predetermined range, gradation correction on each of the object areas to thereby form the output image.

According to the present invention, it is determined whether or not to perform gradation correction of a plurality of object areas in an input image, according to a difference or a ratio between feature values, such as luminance values, of the object areas, and it is determined whether or not to perform the gradation correction, according to a result of the determination. Therefore, when advantageous effects provided by the gradation correction are small, the gradation correction is not performed. As a consequence, it is possible to generate an image by reducing processing load and, what is more, by performing excellent gradation correction of the image if required.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
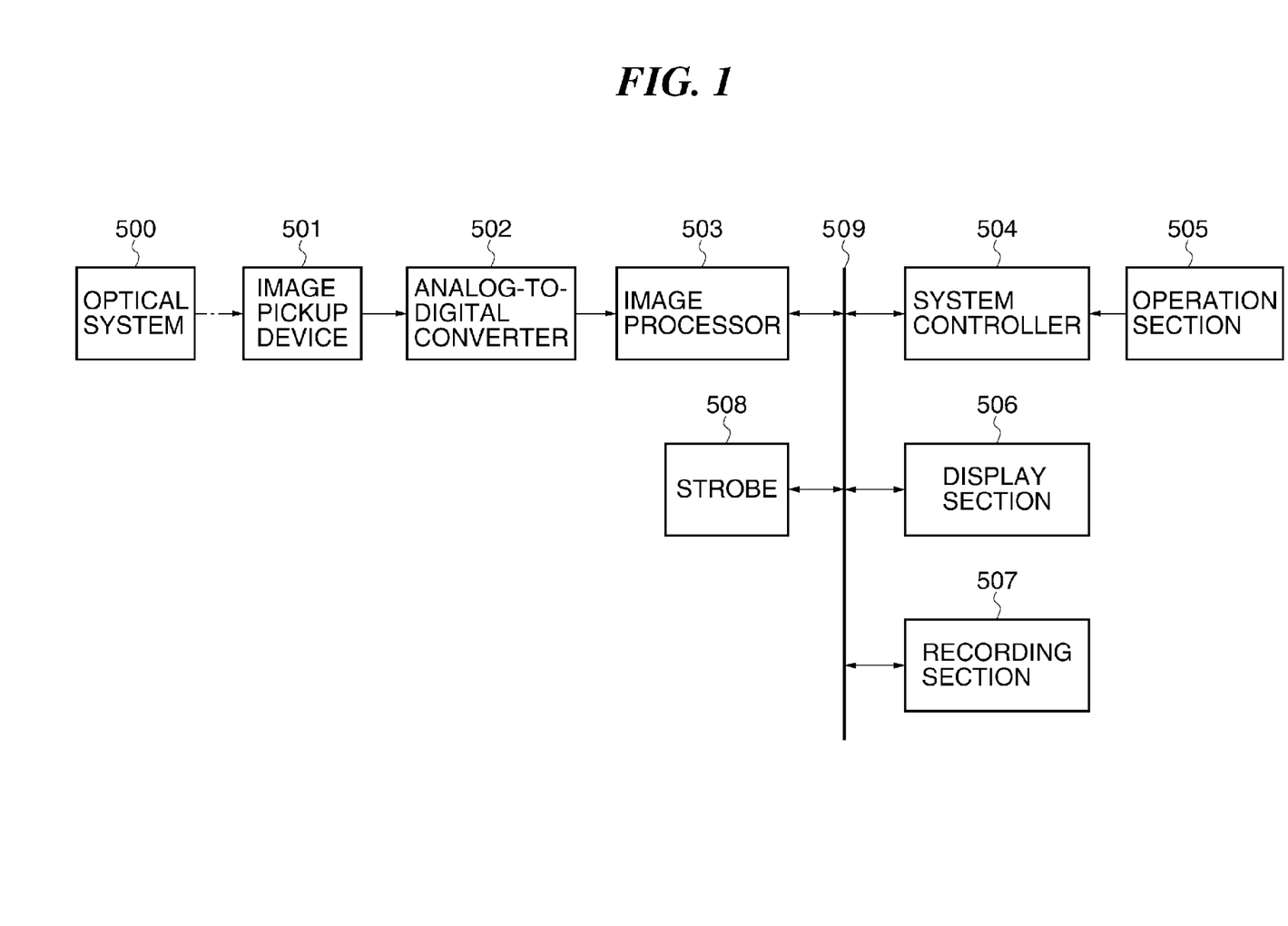
FIG. 1 is a block diagram of an image pickup apparatus including an image processing apparatus according to an embodiment of the present invention.

FIG. 1 is a block diagram of an image pickup apparatus including an image processing apparatus according to an embodiment of the present invention.

The image pickup apparatus shown in FIG. 1 is e.g. a digital camera (hereinafter simply referred to as the "camera"), and includes an optical system 500. The optical system 500 is provided with a lens group including e.g. a zoom lens and a focus lens, an aperture adjuster, and a shutter device (none of which are shown). The optical system 500 adjusts the magnification, focus position, and light amount of an object image (optical image) formed on an image pickup device 501.

The image pickup device 501 converts the optical image formed via the optical system 500 to electric signals (analog signals) by photoelectric conversion. As the image pickup device 501, a photoelectric conversion element, such as a CCD sensor or a CMOS sensor, is used, for example.

An analog-to-digital converter 502 performs analog-to-digital conversion on the analog signal which is an output from the image pickup device 501, to deliver a digital signal (image data). Then, this image data is given to an image processing section 503.

The image processing section 503 performs not only predetermined signal processing but also a so-called area-by-area tone mapping process using a plurality of pieces of image data items (hereinafter, also simply referred to as the "images") different from each other in exposure, as described hereinafter. Note that the image processing section 503 is capable of performing the same image processing not only on an image, which is an output from the analog-to-digital converter 502, but also on an image read out from a recording section 507.

When gradation correction is performed on an entire image such that the brightness of a single object image is made appropriate, the contrast of object images is reduced, resulting in a so-call sleepy image. To prevent such reduction of contrast, there has been proposed e.g. a method in which a photographed image is divided into a plurality of areas, and gradation correction is performed such that each area has appropriate brightness. For example, areas of a person, a sky, and a background are extracted from the photographed image, and respective exposure conditions are determined which make it possible for respective areas to have appropriate brightness. Then, a plurality of photographed images are obtained under such respective exposure conditions that make it possible for respective areas to have appropriate brightness, and the photographed images are synthesized for generation of an output image (synthesized image).

To determine the respective exposure conditions that make it possible for the respective areas to have appropriate brightness, an exposure condition for photographing a main object area may be used as a reference exposure condition. In this case, a photographed image is obtained under the reference exposure condition set for the main object, and then an output image is generated by multiplying the areas other than the main object area of the photographed image by respective gains such that the other areas have appropriate brightness. Such a method is generally called area-by-area tone mapping.

A strobe (light emitting section) 508 emits strobe light under the control of a system controller 504. The system controller 504 controls the overall operation of the camera. Further, the system controller 504 drivingly controls the optical system 500, the image pickup device 501, and the strobe 508 based on luminance values obtained from the images subjected to the image processing by the image processing section 503 or an instruction from an operation section 505.

A display section 506 is a liquid crystal display or an organic EL (Electro Luminescence) display, for example, and displays an image, which is an output from the image processing section 503, or an image read out from the recording section 507. The recording section 507 records e.g. images obtained through photographing by the camera.

Note that the recording section 507 may be an information storage medium, such as a memory card having a semiconductor memory mounted thereon or a magneto-optical disk, which uses a package accommodating a rotating recording member. The information storage medium may be removably mounted on the camera. Further, as shown in FIG. 1, the image processing section 503, the system controller 504, the display section 506, and the recording section 507 are connected to each other by an internal bus 509.

Figure 2:
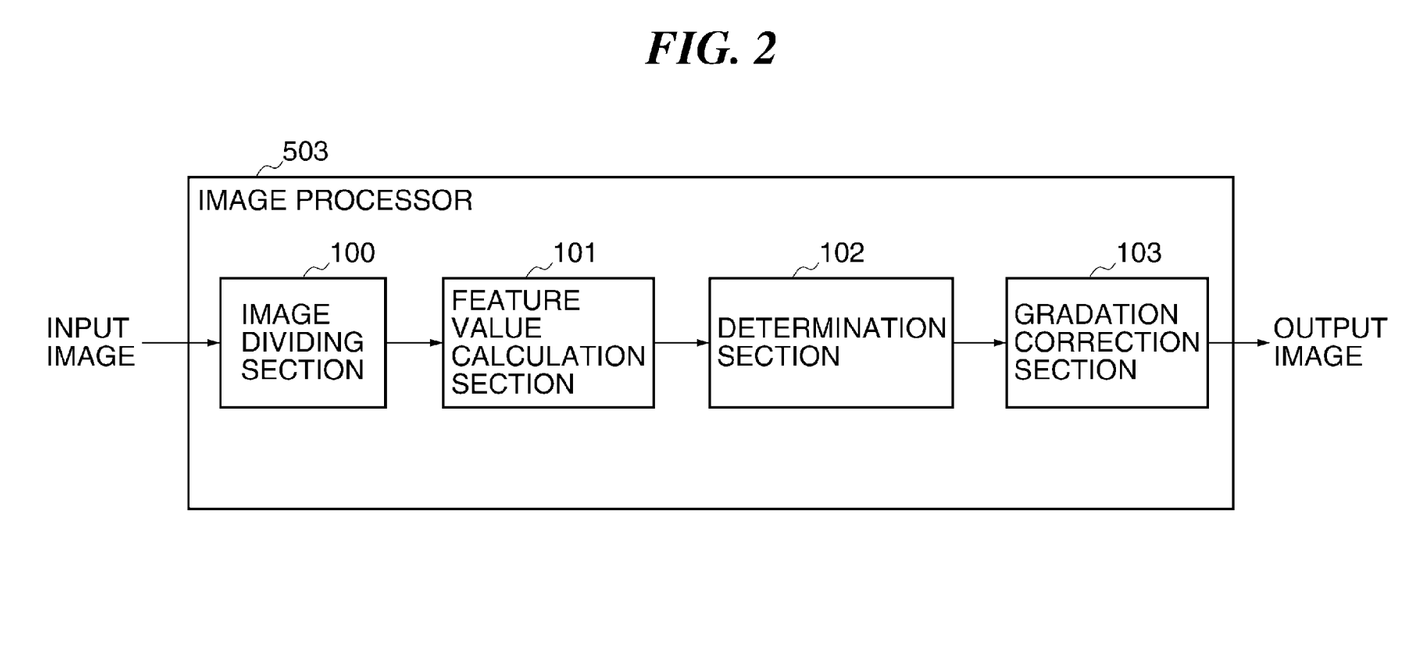
FIG. 2 is a block diagram of an image processing section of the image pickup apparatus shown in FIG. 1, which performs an area-by-area tone mapping process.

FIG. 2 is a block diagram of an image processing section of the image pickup apparatus shown in FIG. 1, which performs an area-by-area tone mapping process. The following description will be given of a case where the area-by-area tone mapping process is performed by dividing an image into the three object areas of a sky area (third object area), a background area (second object area), and a person area (first object area).

Referring to FIG. 2, the image processing section 503 includes an image dividing section 100, a feature value calculation section 101, a determination section 102, and a gradation correction section 103. Image data from the analog-to-digital converter 502 is given to the image dividing section 100 as an input image. The image dividing section 100 divides the input image into a plurality of predetermined object areas, as described hereinafter.

Figure 3:
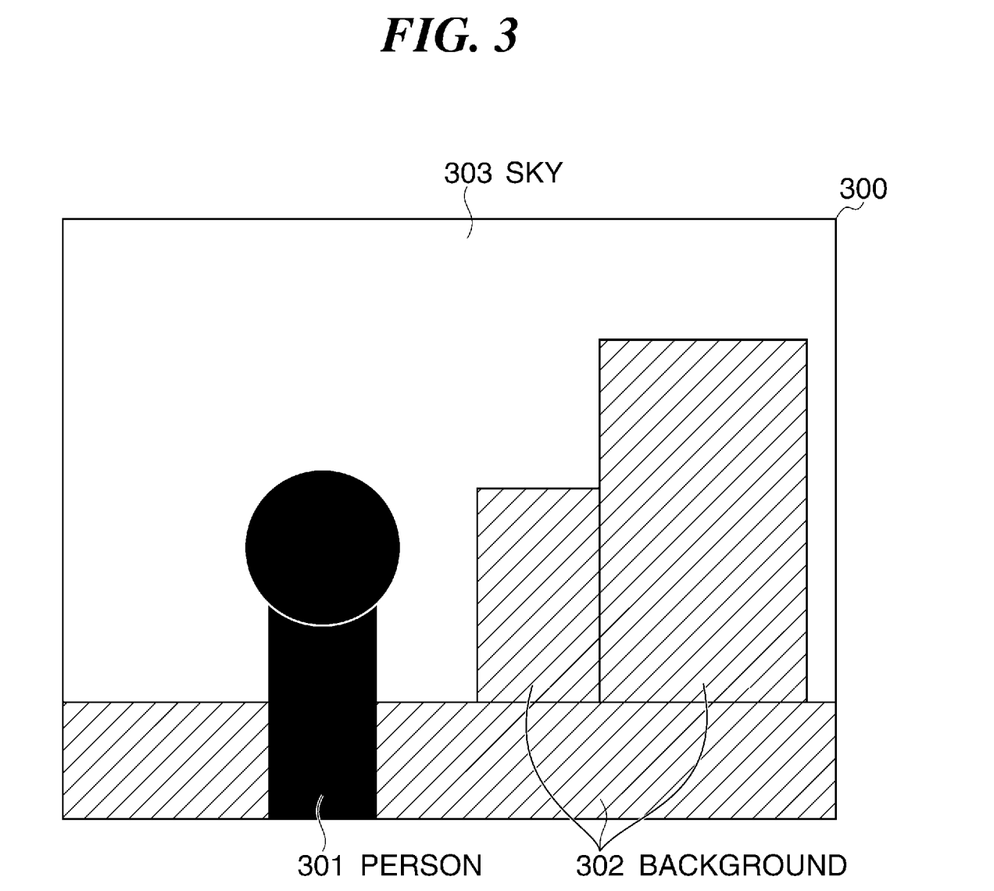
FIG. 3 is a schematic diagram of an image input to an image dividing section shown in FIG. 2.

FIG. 3 is a schematic diagram of an input image 300 input to the image dividing section 100 appearing in FIG. 2.

Here, upon receipt of the input image 300 shown in FIG. 3, the image dividing section 100 divides the input image 300 into the three areas, i.e. the person area, denoted by 301, the background area, denoted by 302, and the sky area, denoted by 303, as the object areas. In the example illustrated in FIG. 3, it is assumed that the input image 300 is photographed in a photographed scene in which a person is in a backlight state, and the sky area 303 is photographed under exposure conditions that prevent a photographed image of the sky area from having so-called blown-out highlights.

The feature value calculation section 101 calculates feature values of the respective object areas (the person area 301, the background area 302, and the sky area 303) obtained through division by the image dividing section 100. In the illustrated example, the feature values are luminance values, for example. The determination section 102 compares the feature values of the object areas obtained by the feature value calculation section 101, and determines whether or not to perform gradation correction according to the results of the comparison.

The gradation correction section 103 performs the gradation correction according to the results of determination by the determination section 102. Note that the gradation correction section 103 performs the gradation correction by performing the area-by-area tone mapping process.

Figure 4:
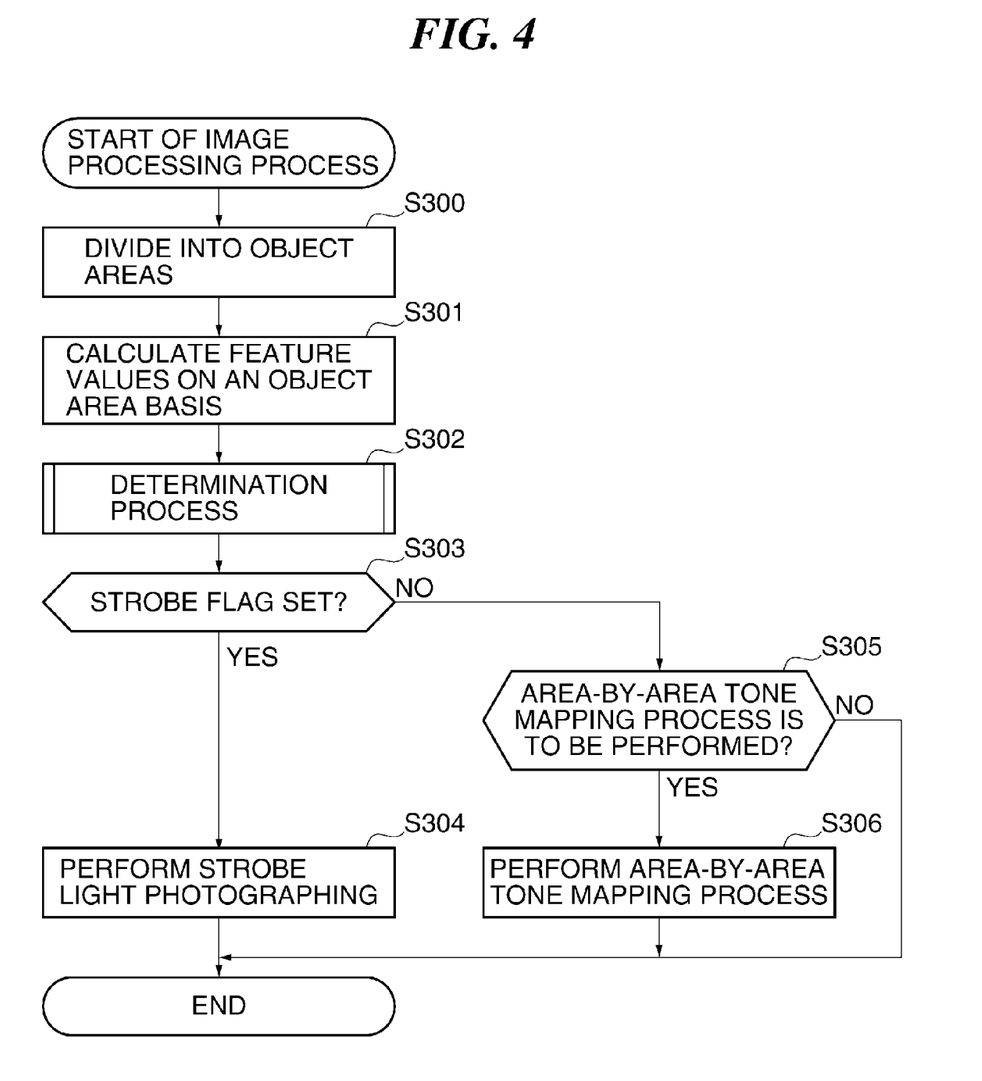
FIG. 4 is a flowchart of an image processing process performed by the image processing section.

FIG. 4 is a flowchart of an image processing process performed by the image processing section 503 shown in FIG. 2.

When the image processing process is started, the image dividing section 100 divides the input image 300 into the three areas, i.e. the person area 301, the sky area 303, and the background area 302, under the control of the system controller 504 (step S300). Processing for identifying and extracting the person area 301 and the sky area 303 from the input image 300 is known, and in the present example, a method disclosed e.g. in Japanese Patent Laid-Open Publication No. 2006-39666 is employed. After extracting the person area 301 and the sky area 303 from the input image 300, the image dividing section 100 sets the other area than the person area 301 and the sky area 303 as the background area 302. The areas divided from the input image are not limited to the person area and the sky area.

Subsequently, the feature value calculation section 101 calculates luminance values of the person area 301, the background area 302, and the sky area 303, as respective feature values (step S301). In the present embodiment, the feature value calculation section 101 calculates an average value of luminance values of pixels included in each of the person area 301, the background area 302, and the sky area 303, to thereby obtain an average luminance value of the pixels for each area.

In the following description, it is assumed that the average luminance value of the pixels in the person area 301 is represented by Y_HUMAN, the average luminance value of the pixels in the sky area 303 is represented by Y_SKY, and the average luminance value of the pixels in the background area 302 is represented by Y_BACK. Then, as described above, the input image 300 is photographed in the photographed scene in which the person is in the backlight state, and hence the average luminance values Y_HUMAN, Y_SKY, and Y_BACK are assumed to have a relationship expressed by an equation (1). Further, in the present embodiment, the feature value of the background area 302, that is, the average luminance value of the pixels in the background area 302 is set as a reference luminance value.

Although the description is given assuming that the input image 300 is photographed in the photographed scene in which the person is in the backlight state, and hence the average luminance values have the relationship expressed by the equation (1), the average luminance values of the pixels in the respective areas are different depending on the photographed scene.

$$Y\_SKY > Y\_BACK > Y\_HUMAN \quad (1)$$

Next, the determination section 102 compares the above-described average luminance values in the respective areas, and determines whether or not to perform gradation correction on an area-by-area basis, i.e. the area-by-area tone mapping process, according to the results of the comparison (step S302).

Figure 5:
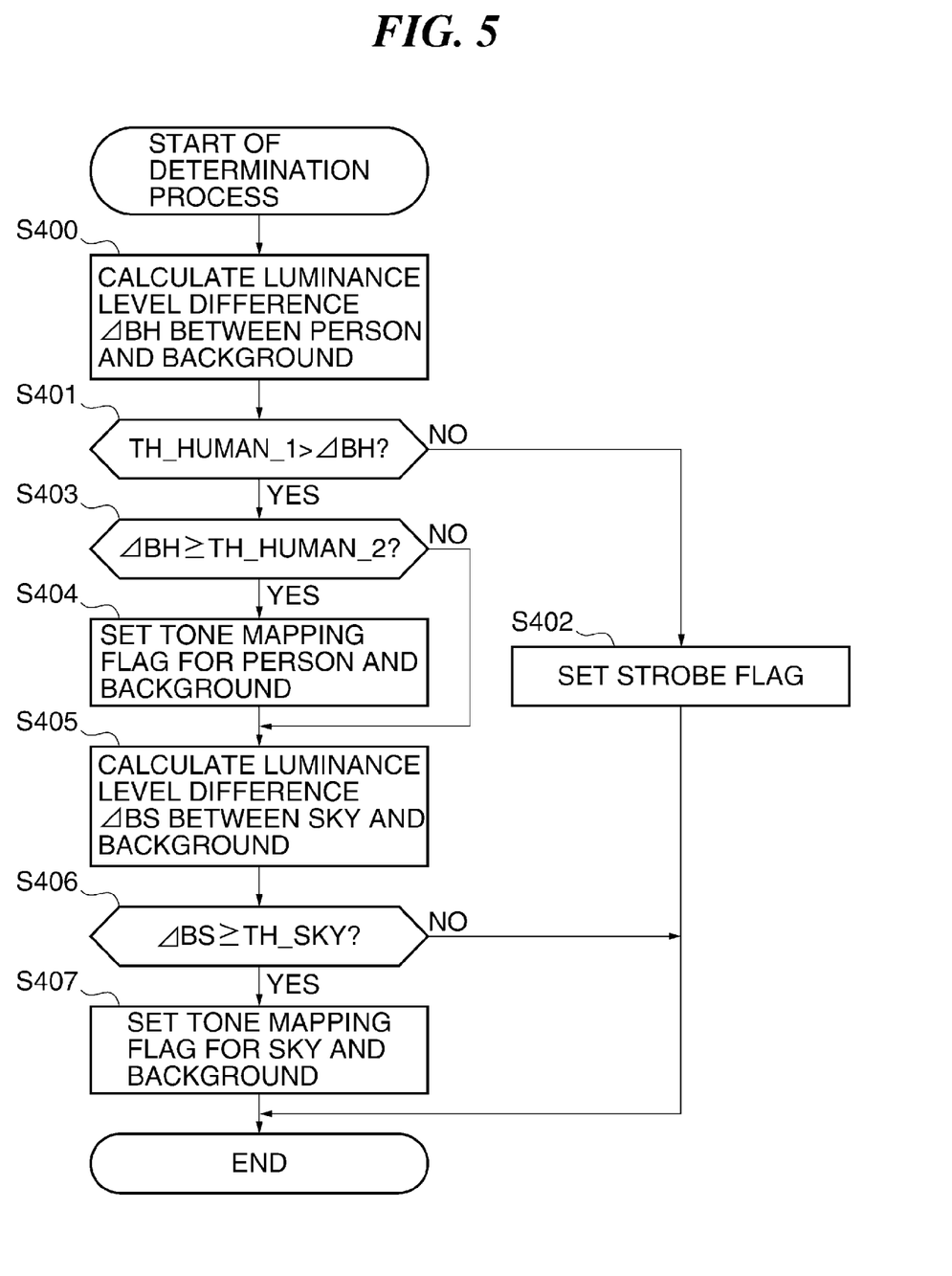
FIG. 5 is a flowchart of a determination process performed by a determination section appearing in FIG. 2.

FIG. 5 is a flowchart of a determination process performed by the determination section 102 shown in FIG. 2.

When the determination process is started, the determination section 102 calculates a luminance level difference ΔBH (i.e. a luminance difference: a first luminance difference) between the person area 301 and the background area 302, using the average luminance values Y_HUMAN and Y_BACK by the following equation (2) (step S400):

$$\Delta BH = ABS\left(LOG_2\left(\frac{Y\_HUMAN}{Yref\_HUMAN}\right) - LOG_2\left(\frac{Y\_BACK}{Yref\_BACK}\right)\right) \quad (2)$$

In this equation, Yref_HUMAN represents a preset target luminance value for the person area, and Yref_BACK represents a preset target luminance value for the background area. Although in the illustrated example, the luminance level difference ΔBH between the person area 301 and the background area 302, which is a difference between the feature values in the respective areas, i.e. the average luminance values in the respective areas, is used, a ratio between the feature values may be used.

Then, the determination section 102 determines whether or not the luminance level difference ΔBH is smaller than a preset first luminance threshold value (TH_HUMAN_1) (step S401). It is desirable that this first luminance threshold value is adjusted according to the photographed scene. For example, in the backlight scene, the first luminance threshold value is set to three levels or so.

Here, a description will be given of a cause why light infiltration occurs in the person area when the area-by-area tone mapping process is performed, in a case where the luminance level difference ΔBH is not smaller than the first luminance threshold value (three levels, in the present example).

When an output image (synthesized image) is generated by photographing a plurality of images under exposure conditions that cause each area to have appropriate brightness, and synthesizing the photographed images, the area-by-area tone mapping process uses, as an image in the person area, an image which can be obtained in a case where exposure conditions for background are set to exposure conditions close to predetermined appropriate conditions, such that an image in the person area is made brighter than an image in the same photographed under the predetermined appropriate exposure conditions. That is, the person area is photographed under exposure conditions which makes an image brighter than the appropriate exposure conditions for photographing a person, and hence the entire image is made brighter. The degree of an increase in brightness of the entire image is proportional to the luminance level difference ΔBH, and when the luminance level difference ΔBH becomes equal to or larger than the first luminance threshold value, light infiltration inevitably occurs in the person area, which makes unclear areas conspicuous.

On the other hand, when exposure conditions for the person area as a main object area are set as reference exposure conditions, and an image is photographed under the reference exposure conditions, if an output image is generated by multiplying signals of object areas (i.e. the background area and the sky area) of the photographed image other than the person area (other than the main object area), by a predetermined gain e.g. a gain commensurate with three levels (i.e. by a large gain), so as to cause each of the object areas to have an appropriate brightness, image quality of the output image is degraded by noise.

In addition, assuming that image data, which is an output of the analog-to-digital converter 502 shown in FIG. 1, is in a 12-bit format, if the object areas are multiplied by a gain of 3 levels, the number of valid bits becomes 9, which reduces the expressible range of gradation.

For this reason, when the luminance level difference ΔBH is not smaller than the first luminance threshold value (NO to the step S401), the determination section 102 determines that no advantageous effect is obtained by the area-by-area tone mapping process. More specifically, when the luminance level difference ΔBH is not smaller than the first luminance threshold value, the determination section 102 determines that the area-by-area tone mapping process is not to be performed since light infiltration will be caused in the person area by the tone mapping process, thereby causing unclear areas.

When the area-by-area tone mapping process is not to be performed, to photograph the person area under appropriate exposure conditions, it is required to photograph the person area by so-called long-time exposure or photograph the person area under dark exposure conditions by setting exposure conditions for the background to appropriate exposure conditions. However, when the person area is photographed by long-time exposure, there is a high possibility that the photographed person area becomes an image spoiled by camera shake or object shake due to long-time exposure. On the other hand, when the person area is photographed under the dark exposure conditions, it is sometimes impossible to obtain an image in which a person area is appropriately photographed.

To solve this problem, the determination section 102 determines that strobe light photographing is to be performed, and sets a flag (strobe flag) indicating that strobe light photographing is to be performed (step S402). Then, the determination section 102 terminates the determination process.

On the other hand, when the luminance level difference ΔBH is smaller than the first luminance threshold value (YES to the step S401), the determination section 102 determines whether or not the luminance level difference ΔBH is not smaller than a second luminance threshold value (TH_HUMAN_2) (step S403). Note that the second luminance threshold value is smaller than the first luminance threshold value. Further, it is desirable that the second luminance threshold value is adjusted according to the photographed scene. For example, in the backlight scene, the second luminance threshold value is set to ⅓ level or so.

If the luminance level difference ΔBH is not smaller than the second luminance threshold value (YES to the step S403), the determination section 102 determines that there will be obtained advantageous effects by the area-by-area tone mapping process for the person area 301 and the background area 302, and sets a flag (tone mapping flag) indicating that the area-by-area tone mapping process for the person area 301 and the background area 302 is to be performed (step S404). Further, the determination section 102 calculates a weighted addition coefficient BH_MIX_RATIO for use in the area-by-area tone mapping process for the person area 301 and the background area 302.

Figure 6:
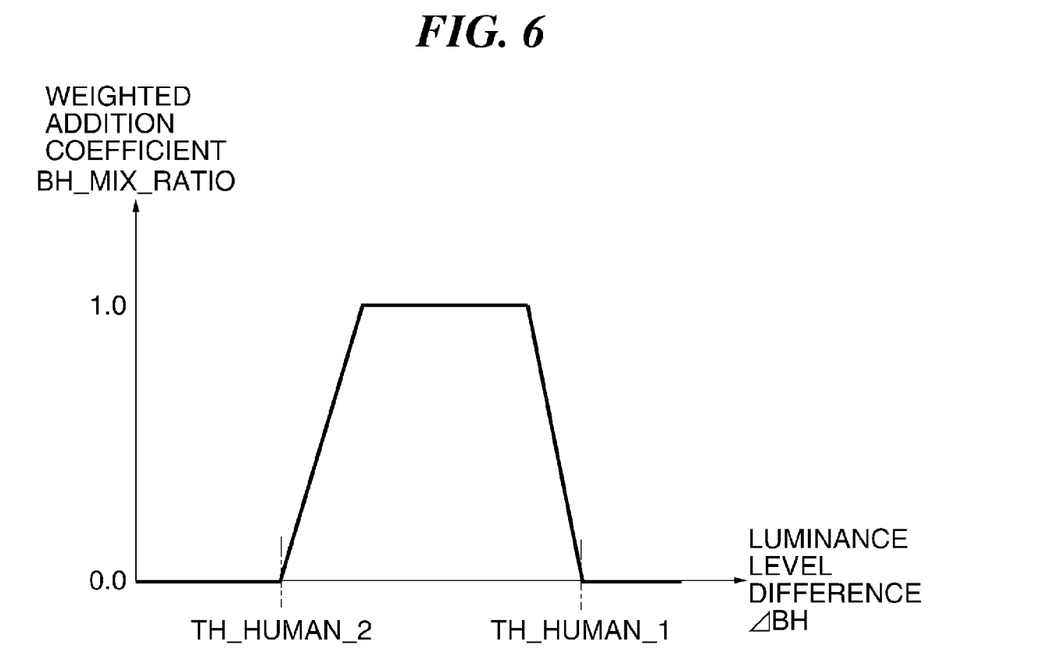
FIG. 6 is a view of an example of a table provided in the determination section, for use in calculating a weighted addition coefficient.

FIG. 6 is a view of an example of a table provided for the determination section 102 shown in FIG. 2, which is used for calculating the weighted addition coefficient for use in the area-by-area tone mapping process for the person area 301 and the background area 302.

In the weighted addition coefficient table shown in FIG. 6, when the luminance level difference ΔBH becomes equal to or larger than the second luminance threshold value (TH_HUMAN_2), the weighted addition coefficient increases from 0.0 up to 1.0. Then, when the luminance level difference ΔBH becomes close to the first luminance threshold value (TH_HUMAN_1), the weighted addition coefficient starts to decrease from 1.0, and when the luminance level difference ΔBH becomes equal to or larger than the first luminance threshold value (TH_HUMAN_1), the weighted addition coefficient becomes equal to 0.0.

It is desirable that the degree of increase or decrease in the weighted addition coefficient is adjusted according to the photographed scene.

Next, the determination section 102 calculates a luminance level difference ΔBS (second luminance difference) between the sky area 303 and the background area 302 (step S405) by the following equation (3):

$$\Delta BH = ABS\left(LOG_2\left(\frac{Y\_SKY}{Yref\_SKY}\right) - LOG_2\left(\frac{Y\_BACK}{Yref\_BACK}\right)\right) \quad (3)$$

wherein Yref_SKY represents a preset target luminance value in the sky area. Although in the present example, the luminance level difference ΔBS for the sky area 303 and the background area 302, which is a difference between the feature values in the respective areas, i.e. the average luminance values in the respective areas, is used, a ratio between the feature values may be used.

Note that if the luminance level difference ΔBH is smaller than the second luminance threshold value (NO to the step S403), the determination section 102 determines that no or small advantageous effects will be obtained by the area-by-area tone mapping process, and hence directly proceeds to the step S405 instead of setting the tone mapping flag for the person area 301 and the background area 302.

Next, the determination section 102 determines whether or not the luminance level difference ΔBS is not smaller than a preset third luminance threshold value (TH_SKY) (step S406). It is desirable that this third luminance threshold value is adjusted according to the photographed scene. For example, in the backlight scene, the third luminance threshold value is set to ⅓ level or so.

If the luminance level difference ΔBS is not smaller than the third luminance threshold value (YES to the step S406), the determination section 102 determines that there will be obtained advantageous effects by the area-by-area tone mapping process, and sets a flag (tone mapping flag) indicating that the area-by-area tone mapping process for the sky area 303 and the background area 302 is to be performed (step S407). Further, the determination section 102 calculates a weighted addition coefficient BS_MIX_RATIO for use in the area-by-area tone mapping process for the sky area 303 and the background area 302. Then, the determination section 102 terminates the determination process.

Figure 7:
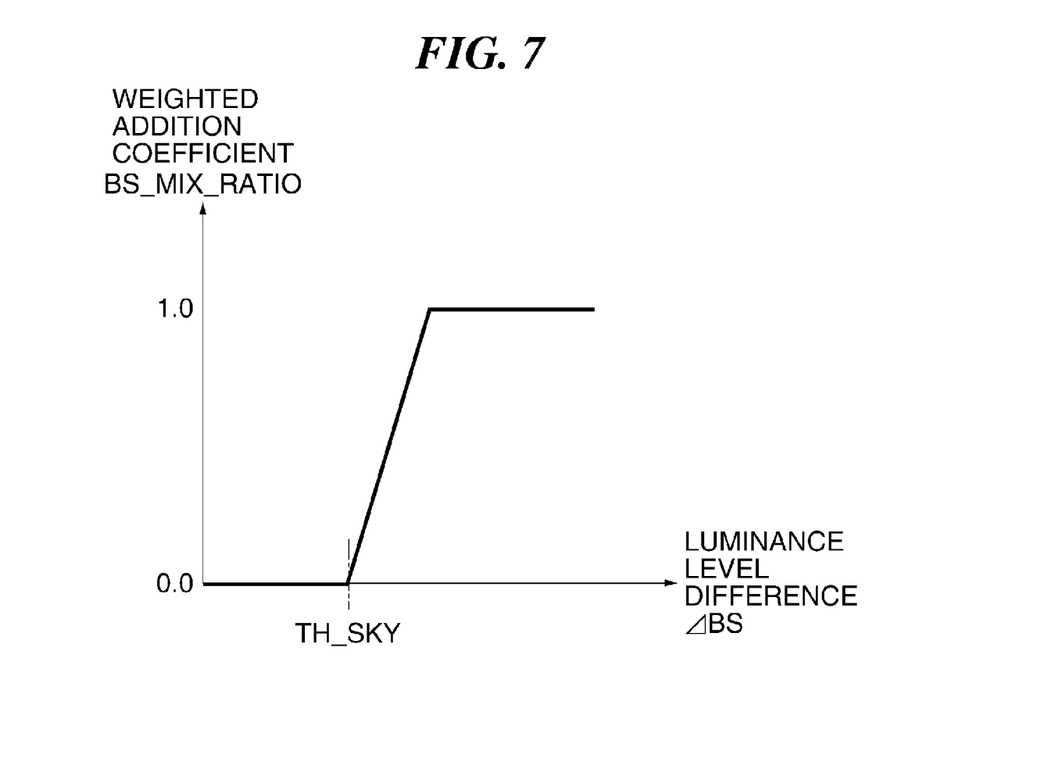
FIG. 7 is a view of another example of a table provided in the determination section, for use in calculating a weighted addition coefficient.

FIG. 7 is a view of another example of a table provided for the determination section 102 shown in FIG. 2, which is used for calculating the weighted addition coefficient for use in the area-by-area tone mapping process for the sky area 303 and the background area 302.

In the weighted addition coefficient table shown in FIG. 7, when the luminance level difference ΔBS becomes equal to or larger than the third luminance threshold value (TH_SKY), the weighted addition coefficient increases from 0.0 up to 1.0. Then, the weighted addition coefficient is held at 1.0 irrespective of increase in the luminance level difference ΔBS.

It is desirable that the degree of increase or decrease in the weighted addition coefficient is adjusted according to the photographed scene.

On the other hand, if the luminance level difference ΔBS is smaller than the third luminance threshold value (NO to the step S406), the determination section 102 determines that no or small advantageous effects will be obtained by the areaby-area tone mapping process for the sky area 303 and the background area 302, and terminates the determination process.

Referring again to FIG. 4, after the determination process has been executed as described above, the system controller 504 determines whether or not the strobe flag is set (step S303). If the strobe flag is set (YES to the step S303), the system controller 504 controls light emission from the strobe 508 to thereby perform strobe light photographing (step S304), and executes image data processing at the time of strobe light photographing to thereby obtain an output image, followed by terminating the present image processing process.

On the other hand, if the strobe flag is not set (NO to the step S303), the system controller 504 determines whether or not there is set at least one of the tone mapping flag for the area-by-area tone mapping process for the person area 301 and the background area 302 and the tone mapping flag for the area-by-area tone mapping process for the sky area 303 and the background area 302 (step S305). In short, the system controller 504 determines whether or not to perform the area-by-area tone mapping process. If neither of the tone mapping flags is set (NO to the step S305), the system controller 504 outputs the input image 300 as it is, followed by terminating the present image processing process.

If at least one of the tone mapping flags is set (YES to the step S305), the system controller 504 instructs the image processing section 503 to execute the area-by-area tone mapping process (step S306). Accordingly, the image processing section 503 (particularly, the gradation correction section 103) executes the area-by-area tone mapping process, and generates a synthesized image.

More specifically, when it is determined that the area-by-area tone mapping process is to be performed, the image processing section 503 obtains e.g. a plurality of images (three images, in the present embodiment) photographed under respective exposure conditions that cause the respective areas (i.e. the person area, the background area, and the sky area) subjected to the tone mapping to have appropriate brightness, and sets the respective images as an image for the person, an image for the background, and an image for the sky. Then, the image processing section 503 extracts the person area, the background area, and the sky area from the image for the person, the image for the background, and the image for the sky, respectively. After that, the image processing section 503 synthesizes the person area, the background area, and the sky area, and outputs a synthesized image thus obtained as an output image.

To determine the respective exposure conditions that make it possible for the person area, the background area, and the sky area to have appropriate brightness, an exposure condition for photographing, for example, a main object area may be used as a reference exposure condition. Then, a single image is photographed under the reference exposure condition, and then the image processing section 504 may perform gain processing on areas other than the person area of the single mage so as to cause the other areas than the person area to have appropriate brightness, to thereby generate an output image.

After performing the area-by-area tone mapping process as described above, the gradation correction section 103 performs weighted addition processing (i.e. gradation correction) on the object areas (i.e. the person area, the background area, and the sky area) according to the weighted addition coefficients (the BH_MIX_RATIO and an SH_MIX_RATIO). The weighted addition processing is performed using the following equations (4) and (5):

$$\text{MIX\_HUMAN} = \text{BEFORE\_HUMAN} \times (1.0 - BH\_MIX\_RATIO) + \text{AFTER\_HUMAN} \times BH\_MIX\_RATIO \quad (4)$$

$$\text{MIX\_SKY} = \text{BEFORE\_SKY} \times (1.0 - SH\_MIX\_RATIO) + \text{AFTER\_SKY} \times SH\_MIX\_RATIO \quad (5)$$

wherein BEFORE_HUMAN represents data of the person area before being subjected to the area-by-area tone mapping process, AFTER_HUMAN represents data of the person area after being subjected to the area-by-area tone mapping process, BEFORE_SKY represents data of the sky area before being subjected to the area-by-area tone mapping process, and AFTER_SKY represents data of the sky area after being subjected to the area-by-area tone mapping process, MIX_HUMAN and MIX_SKY indicate respective data of the person area and the sky area after being subjected to the weighted addition processing.

After the weighted addition processing has been performed on the respective data of the person area and the sky area as described above, the image processing section 503 outputs the synthesized image as an output image.

Although in the above described example, the description has been given of the case where after execution of the weighted addition processing, the synthesized image is output as an output image, this is not limitative, but when the luminance level difference $\Delta BH$ is not smaller than the second luminance threshold value or the luminance level difference $\Delta BS$ is not smaller than the third luminance threshold value, the synthesized image obtained by the area-by-area tone mapping process may be output as an output image without being subjected to the weighted addition processing.

Further, although in the above described example, the area-by-area tone mapping process is performed with reference to the feature value of the background area (the average luminance value), this is not limitative, but for example, the area-by-area tone mapping process may be performed with reference to the feature value of the person area or the sky area.

Further, when the area-by-area tone mapping process is not performed, an image is output as an output image, which is photographed by adjusting the exposure condition to a main object area selected from the person area, the background area, and the sky area.

As described hereinabove, in the embodiment of the present invention, when the luminance level difference between a plurality of object areas is smaller than a predetermined luminance threshold value, that is, when it is determined that advantageous effects obtained by the area-by-area tone mapping process are small, the area-by-area tone mapping process is not performed, and hence it is possible to reduce processing load on the image processing section 503.

Further, when the luminance level difference between a plurality of object areas (e.g. the person area and the background area) is not smaller than a predetermined luminance threshold value larger than the above-mentioned luminance threshold value, the area-by-area tone mapping process is not performed, so that it is possible to avoid generation of an output image which has unclear areas caused by light infiltration. In this case, strobe light photographing is caused to be performed, whereby it is possible to generate an output image of which gradation has been excellently corrected.

As is clear from the above description, in the example illustrated in FIGS. 1 and 2, the image processing section 503 and the system controller 504 are used as the image processing apparatus. Further, the image dividing section 100 functions as a dividing unit, and the feature value calculation section 101 and the determination section 102 function as a determination unit. Further, the image processing section 503

(gradation correction section 103) and the system controller 504 function as an image processing unit. Furthermore, the system controller 504 functions as an instruction unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, a control method based on the functions of the above-described embodiment may be caused to be executed by the image processing apparatus. Further, a control program implementing the functions of the above-described embodiment may be caused to be executed by a computer provided in the image processing apparatus. The control program is stored e.g. in a computer-readable storage medium.

The control method and the control program each include at least a division step, a determination step, and an image processing step.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

This application claims the benefit of Japanese Patent Application No. 2013-051879 filed Mar. 14, 2013, which is hereby incorporated by reference herein in its entirety.

What is claimed is:

1. An image processing apparatus that obtains an output image by performing image processing on an input image, comprising:
a dividing unit configured to divide the input image into a plurality of object areas, including at least a first object area and a second object area;
a determination unit configured to compare feature values indicative of features of the respective object areas to thereby obtain a difference or a ratio between the feature values, and determine whether or not the difference or the ratio is within a predetermined range between a first threshold value and a second threshold value smaller than the first threshold value; and
an image processing unit configured, when it is determined by said determination unit that the difference or the ratio is within the predetermined range, to perform gradation correction on each of the first and second object areas to thereby form the output image.

2. The image processing apparatus according to claim 1, wherein, when it is determined by said determination unit that the difference or the ratio is within the predetermined range, said image processing unit outputs, as the output image, a synthesized image which is formed by synthesizing a plurality of images obtained based on respective exposure conditions of the object areas, dependent on the respective feature values of the object areas.

3. The image processing apparatus according to claim 1, wherein, when it is determined by said determination unit that the difference or the ratio is within the predetermined range, said image processing unit sets one of the object areas as a main object area, and forms the output image by performing gain processing on an image obtained with exposure conditions dependent on a feature value of the main object area, so as to adjust gains of the object areas other than the main object area.

4. The image processing apparatus according to claim 1, wherein the feature values represent respective luminance values of the object areas.

5. The image processing apparatus according to claim 1, wherein the object areas further including a third object area, and the feature values are each an average luminance value indicative of an average value of luminance values of each object area,
wherein when said determination unit determines with reference to the second object area that a difference in the average luminance value between the first object area and the second object area is within the predetermined range defined as between a first luminance threshold value and a second luminance threshold value smaller than the first luminance threshold value, said image processing unit performs gradation correction on the first object area and the second object area.

6. The image processing apparatus according to claim 5, further comprising an instruction unit configured to instruct strobe light photographing when said determination unit determines that the difference in the average luminance value between the first object area and the second object area is not smaller than the first luminance threshold value.

7. The image processing apparatus according to claim 5, wherein when said determination unit determines that a difference in the average luminance value between the second object area and the third object area is not smaller than a third luminance threshold value smaller than the first luminance threshold value, said image processing unit performs gradation correction on the second object area and the third object area.

8. The image processing apparatus according to claim 5, wherein the first object area, the second object area, and the third object area are a person area, a background area, and a sky area, respectively.

9. A method of controlling an image processing apparatus that obtains an output image by performing image processing on an input image, comprising:
dividing the input image, input into the image processing apparatus, into a plurality of object areas, including at least a first object area and a second object area, with an image dividing unit;
comparing feature values indicative of features of the first and second object areas to thereby obtain a difference or a ratio between the feature values, and determining whether or not the difference or the ratio is within a predetermined range between a first threshold value and a second threshold value smaller than the first threshold value; and performing, when it is determined by said determining that the difference or the ratio is within the predetermined range, gradation correction on each of the first and second object areas to thereby form the output image of the image processing apparatus.

10. A non-transitory computer-readable storage medium storing a control program for causing a computer to execute a method of controlling an image processing apparatus that obtains an output image by performing image processing on an input image, wherein the method comprises:

dividing the input image into a plurality of object areas, including at least a first object area and a second object area;

comparing feature values indicative of features of the respective object areas to thereby obtain a difference or a ratio between the feature values, and determining whether or not the difference or the ratio is within a predetermined range between a first threshold value and a second threshold value smaller than the first threshold value; and performing, when it is determined by said determining that the difference or the ratio is within the predetermined range, gradation correction on each of the first and second object areas to thereby form the output image.

* * * * *